United States Patent [19]
Estes et al.

[11] 3,741,393
[45] June 26, 1973

[54] AERATION SEPTIC TANK

[75] Inventors: James Estes, George A. Laird, both of Santa Ana, Calif.

[73] Assignee: Aeration Septic Tank Company, Gunnison, Colo.

[22] Filed: Feb. 22, 1972

[21] Appl. No.: 228,045

[52] U.S. Cl. ............. 210/195, 210/221, 210/532 S, 261/123
[51] Int. Cl. ............................................ B03d 1/00
[58] Field of Search .................. 210/2, 7, 15, 16, 210/63, 150, 151, 194, 195, 196, 197, 200, 201, 202, 205, 219, 221, 258, 261, 319, 320, 521, 532 S, 535

[56] References Cited
UNITED STATES PATENTS

| | | | |
|---|---|---|---|
| 3,109,813 | 11/1963 | Bergsten et al. | 210/532 |
| 3,202,285 | 8/1965 | Williams | 210/221 X |
| 3,221,881 | 12/1965 | Weiler et al. | 210/532 X |
| 3,677,409 | 7/1972 | Ferm et al. | 210/221 X |

Primary Examiner—Samih N. Zaharna
Assistant Examiner—Robert H. Spitzer
Attorney—Allan Rothenberg et al.

[57] ABSTRACT

A rigid lightweight septic tank construction employs a corrugated tubular shell, corrugated end walls and intermediate bulkheads that separate the tank into three functionally distinct major chambers. A panel extending from an opening formed in one of the bulkheads separates one of the tank chambers into two clarifying and settling compartments from which the treated sewage may be discharged.

9 Claims, 8 Drawing Figures

PATENTED JUN 26 1973　　　　　　　　　3,741,393

AERATION SEPTIC TANK

BACKGROUND OF THE INVENTION

1. Field of the Invention

The present invention relates to the treatment of sewage and more particularly concerns a rigid lightweight multi-chambered tank of improved construction and operating characteristics.

2. Description of Prior Art

Settling and holding tanks that provide for the breakdown and decomposition of sewage by means of aerobic and anaerobic bacterial action are commonly used in large scale installations. For treatment of smaller quantities of sewage, as in private or semi-public use, the septic tank has been widely used despite the fact that the sewage discharged from such devices does not meet health codes in many situations. Effluent of the septic tank cannot be readily disposed of and must be handled or otherwise controlled so as to minimize its contaminating effects.

As an improvement upon the common septic tank, the apparatus shown in the U.S. Pat. No. 2,852,140 to A. S. MacLaren, describes a tank for handling relatively small quantities of sewage as would be discharged from a private home, for example, and which tank can be employed either as a slightly modified septic tank for primary treatment, or together with an aeration arrangement for secondary treatment and further breakdown of the sewage. The MacLaren arrangement is formed of concrete and may weigh as much as 10,000 pounds. It is thus quite difficult and costly to transport to the relatively remote locations where such private sewage systems are likely to be employed. In general, the intake and discharge arrangements of MacLaren are not properly arranged for optimum operation. The inlet pipe will discharge the incoming sewage at a point above the normal surface of sewage contained in the tank of MacLaren. The sewage in this first chamber normally acquires a relatively hard surface layer many inches thick that will soon prevent or seriously interfere with the flow of incoming sewage. Further, the settling and clarifying operation in the single rearward chamber of MacLaren will retain undesirable quantities and sizes of material in suspension, thus requiring an exit weir to control exit flow. Operation of the weir, as well known, depends upon rate of flow of liquid through the system, wherefore adjustment of the weir may be desirable although difficult to achieve as the system flow rate varies.

Accordingly, it is the object of the present invention to provide an aeration septic tank of improved operating characteristics, adequate strength and ready portability.

SUMMARY OF THE INVENTION

In carrying out principles of the present invention in accordance with a preferred embodiment thereof, an aeration septic tank is formed of a thin transversely corrugated plastic shell, having end walls and intermediate bulkheads separating the tank into three major compartments. An inclined panel extends from an opening in a peripherally continuous intermediate bulkhead and separates the end portion of the tank into two settling and clarifying compartments to better condition the effluent therefrom.

DETAILED DESCRIPTION

Figure 1:
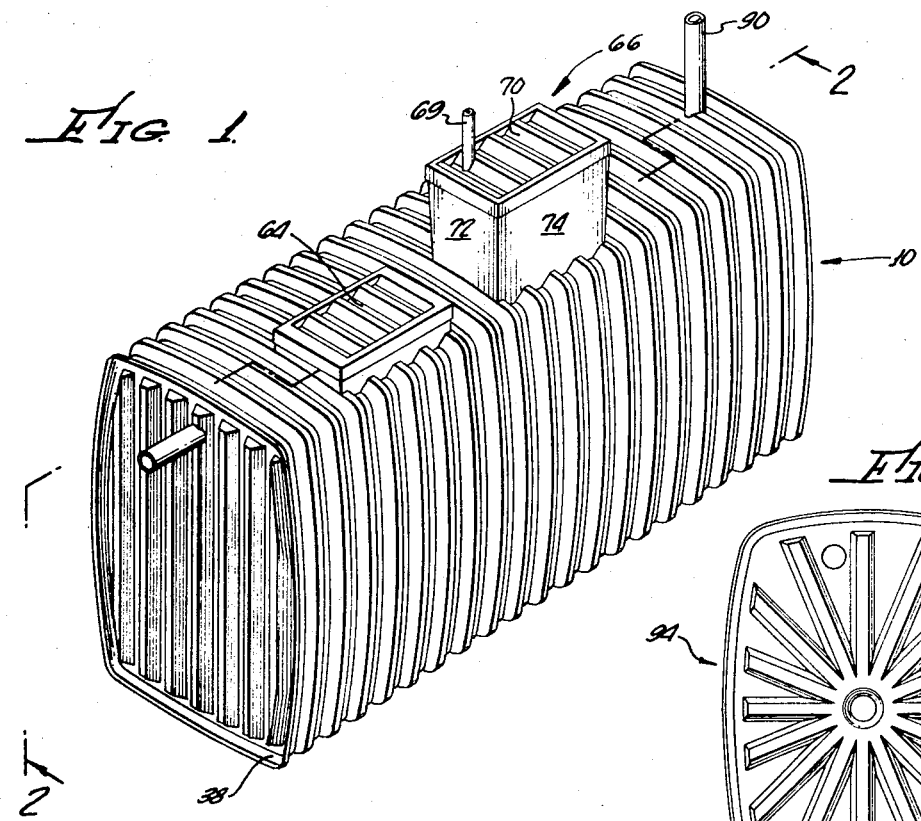
FIG. 1 is a pictorial view of an assembled tank constructed in accordance with principles of the present invention.
Figure 2:
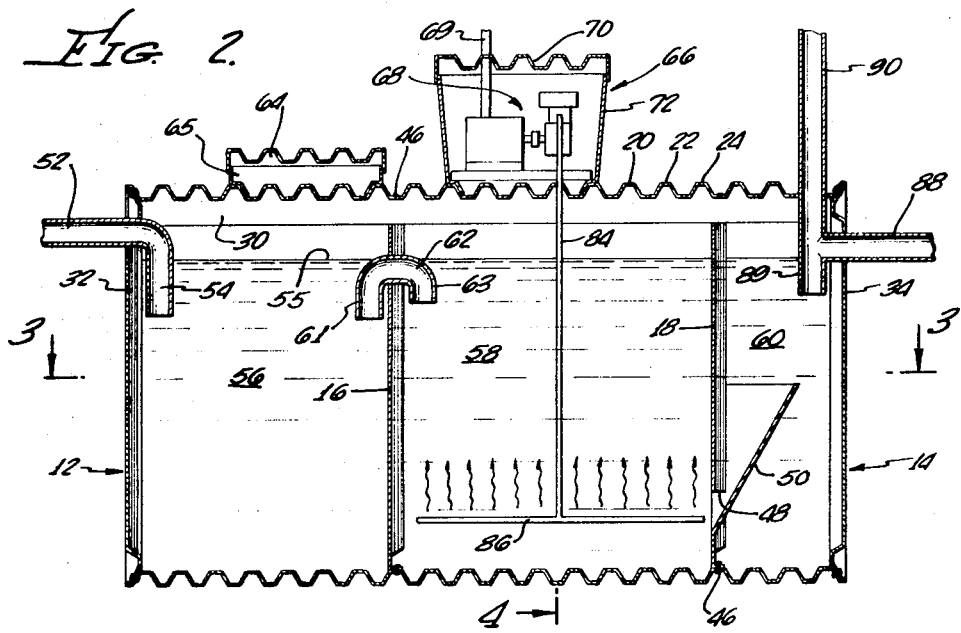
FIG. 2 is a vertical section taken along lines 2—2 of FIG. 1.
Figure 3:
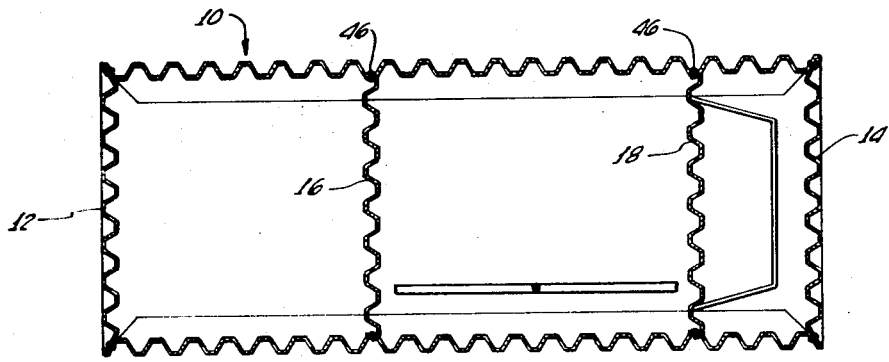
FIG. 3 is a horizontal section taken on lines 3—3 of FIG. 2.

As shown in the drawings and particularly referring to FIGS. 1, 2 and 3, the disclosed aeration septic tank includes an outer tubular shell 10 of a somewhat oval cross-sectional configuration, first and second end walls 12 and 14, and first and second intermediate bulkheads 16, 18. Preferably the shell, end walls and bulkheads are all formed of a relatively thin plastic material, individually and separately molded in the indicated configuration, and each formed with suitable stiffening corrugations. Although the many different plastic materials are well known and suitable for manufacture of the described tanks, polyester resin such as Koppers Co. 1063-5, 1061-5 and 2062-5, and the Duypil 455-1 resin of Sherwin Williams, V-59-VY149 and V-59-VY150 are preferred for strength, durability and facility of manufacture of molding manufacture and assembly. Sherwin Williams isothalic resin V-59-VY94 has the additional desired quality of resistance to alkali. These resins are used to bind several lamina of fiber glass cloth such as, for example 10 ounce Valam manufactured by Uniglass Industries. The several cloth layers and impregnating resins are laid up in conventional and well-known manner upon a base mat of a 3 ounce pressed fiber. Alternatively, the resin may be sprayed upon the mold and mixed with glass fibers in the course of the spraying process. These fibers are thus suspended within the resin as it cures wherefor no cloth layers are required.

For maximum strength, the tubular shell 10 is formed with corrugations such as those illustrated at 20, 22 and 24 of FIG. 2, which are mutually spaced from each other for the entire length of the tank and which extend completely and entirely around the circumference thereof.

In order to further strengthen the shell 10, a plurality of substantially horizontal beams 26, 28 and 30 are fixed to the two sides and also the top of the interior of of the shell, extending for substantially the entire length thereof. That side of each of beams 26, 28 and 30 that abuts the shell 10 is shaped to conform with the shell corrugations so as to provide a close fitting contact between the beam and shell interior. If deemed necessary or desirable the top interior beam 30 may be omitted.

Figure 6:
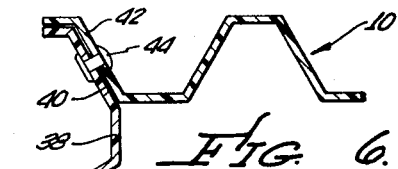
FIG. 6 is a detail illustrating the connection between the tubular shell and an end wall.

A pair of end walls 32 and 34 are fixed to and seal the ends of the tubular shell 12 to complete the enclosure of the tank. Each of the end walls is formed, like the shell, of a relatively thin sheet of molded plastic and each has a plurality of mutually spaced corrugations extending across its entire area. Each end wall is formed with a continuous peripheral rim 38 that strengthens the wall and facilitates attachment and sealing of the wall to the shell 10. As shown in the detail of FIG. 6, the continuous peripheral rim 38 of an end wall 32 includes an outwardly inclined surface 40 that mates with a complementary outwardly inclined leg 42 of an end corrugation of the shell 10. After application of a suitable sealant and adhesive to the mating surfaces of elements 40 and 42, a plurality of fastening elements such as rivets 44 are applied to the mating parts to fixedly secure them to each other.

Intermediate bulkheads 16 and 18 are each formed of a relatively thin molded plastic substantially fully formed with stiffening corrugation and also formed with a continuous peripheral stiffening and attachment lip. In order to facilitate attachment of the bulkheads 16 and 18, they are formed with outer dimensions that conform to the internal dimensions of the shell so that the stiffening rim of each bulkhead will seat upon an inwardly extending surface of the peripheral shell corrugations as shown in FIGS. 2 and 3. The outer dimensions of the end walls mate with the outer dimensions of the shell corrugations as best illustrated in FIGS. 2 and 3.

Each of the intermediate bulkheads 16 and 18 is formed with a pair of diametrically opposed side notches and a substantially centrally located notch in its upper edge that will smoothly receive respective ones of the beams 26, 28 and 30. In assembly of the tank, the interfitting beams and notches aid in properly orienting the intermediate bulkheads as they are slid into position from the ends of the shell with the beams acting as guide rails during assembly. Suitable sealant and adhesive is interposed between mating surfaces of the peripheral rims of the intermediate bulkhead and the inner surfaces of the tubular shell and also between the several stiffening beams and the intermediate bulkheads, and fasteners such as rivets 46 are applied through the shell and bulkhead rim.

Figure 4:
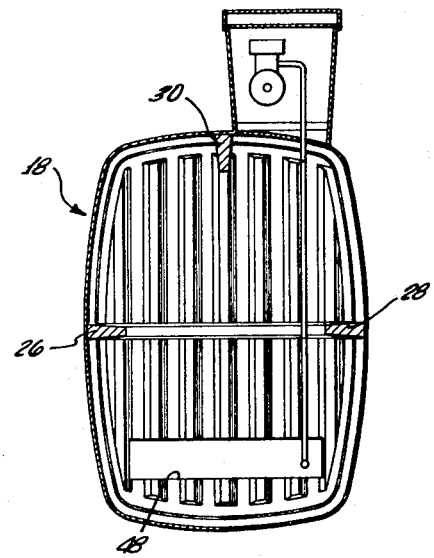
FIG. 4 is a vertical section taken on lines 4—4 of FIG. 2.

As illustrated in FIG. 4, intermediate bulkhead 18 is formed with a slot or opening 48 that extends almost entirely across the width of the bulkhead and is positioned adjacent to but spaced from the bulkhead lower end. With this arrangement, a full and relatively unrestricted flow of liquid is provided through the bulkhead 18. Yet its structural integrity remains intact because of the continuity of its periphery that is afforded by the size and position of the slot 48. Thus the bulkhead 18 enhances rigidity of the tubular shell 10 throughout its entire circumference.

Figure 5:
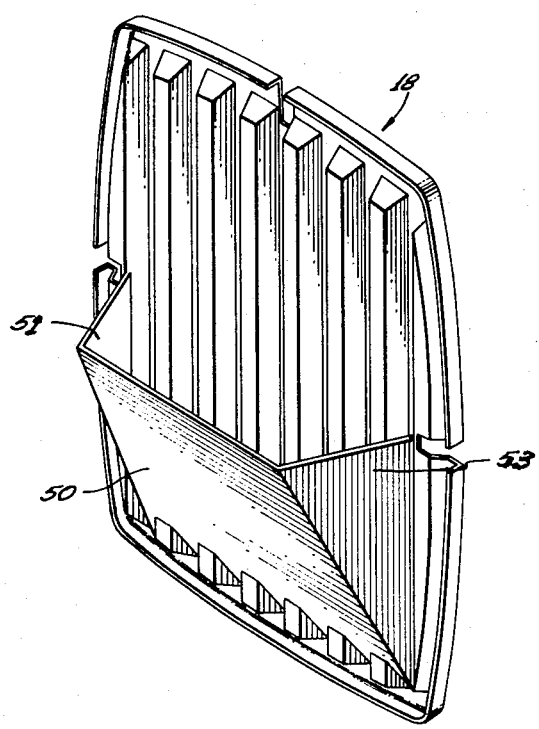
FIG. 5 is a pictorial view of the second intermediate bulkhead and the inclined panel secured thereto.

Fixed to the lower end of slot 48 in bulkhead 18 is an inclined panel 50 that extends across the full length of the slot upwardly and rearwardly toward the end wall 14. Panel 50 is provided with a pair of sides 51, 53 that extend from the panel to attachment to the body of the intermediate bulkhead 18, as best seen in FIG. 5. The upper end of panel 50 is spaced from the end wall 14 for purposes to be more particularly described hereinafter.

An inlet conduit has a substantially horizontal branch 52 projecting outwardly through the end wall 12 and sealed thereto. Within the first tank chamber formed between end wall 12 and the first intermediate bulkhead 16, the inlet conduit has an elbow and a downwardly extending arm 54 that terminates at a point some eight to ten inches below the level of sewage that will normally be contained in the operating tank.

In order to provide communication between the first chamber 56 and a second chamber 58 formed within the shell between intermediate bulkheads 16 and 18, there is provided a substantially inverted U-shaped conduit 62 that extends through and is sealed to a suitable aperture in the bulkhead 16. The conduit 62 has a downwardly extending leg 61 that terminates well below the surface of the sewage contained in chamber 56. On the other side of the bulkhead conduit leg 63 also extends downwardly below the surface of sewage contained in chamber 58.

A detachable cover 64 closes a suitable opening in the top of the tubular shell to permit access to chamber 56 as may be necessary or desirable to remove accumulated deposits from time to time.

Mounted atop the shell, preferably above chamber 58, is a compressor housing 66 in which is mounted an air compressor 68 that is accessible by means of a detachable housing cover 70.

Figure 7:
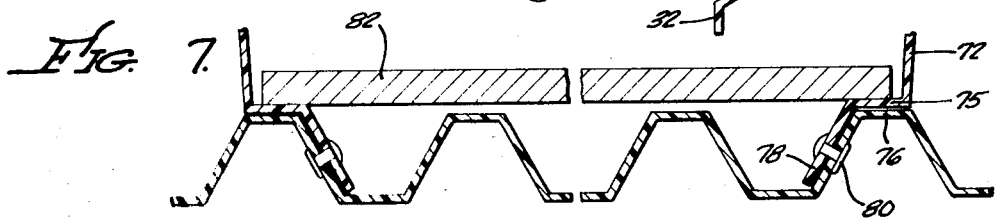
FIG. 7 is an enlarged illustration of the connection between the compressor housing and the tank shell.

The compressor housing 66 is formed with interconnected end and side walls 72, 74. End walls 72 are each formed with an inwardly directed support flange 75 that extends across the end wall and housing (FIG. 7). Each flange rests upon and is supported by the upper surface of one of the corrugations, such as corrugations 76 that extend across the top of the shell. Each support flange 75 has an integral downwardly and inwardly extending positioning flange 78, that mates with the corresponding inclined surface of the transverse upper corrugation 76. Suitable sealing and adhesive material is interposed between the mating surfaces of corrugation 76 and flange 78. The two are then affixed to each other by suitable securing means such as the illustrated rivet 80. A compressor support 82 rests upon and bridges the two support flanges of the housing end walls, and may be suitably secured thereto by means not shown in FIG. 7. Compressor 68 (FIG. 2) is suitably mounted to and supported by the bridging support 82.

An air conduit 84 is connected with the pressure side of compressor 68 and extends through a suitable aperture in the shell 10 to a point within chamber 58 adjacent the bottom of the tank. Connected to the bottom of the air conduit 84 is an inner distribution manifold 86 that extends longitudinally of the tank adjacent its bottom. Manifold 86 is provided with a plurality of air discharging apertures distributed along its length and each directed downwardly and outwardly at an angle of about 45° from the horizontal. Compressor 68 is provided with an upwardly extending air intake 69 and its housing is covered with soil so that the intake of pipe 69 is approximately six inches above the surface.

A discharge conduit 88 extends through and is sealed to an aperture in end wall 14, terminating within chamber 60 in a T. The T of the discharge conduit 88 has a downwardly extending leg that projects below the surface of the sewage normally maintained in the tank whereas the other leg of the T extends upwardly through the shell 10 for a suitable distance beyond the tank and is provided with a removable cover (not shown).

In the manufacture and assembly of the described tank, the tubular shell is first molded either as a single corrugated tube sprayed upon a mandrel that has radially retractible circumferential ribs, or it may be molded in two longitudinally separated sections which are then secured to each other, as by application of resin sprayed or painted thereon, to extend along the pair of longitudinal seams. The plastic employed is preferably a suspension of glass fibers carried in a suitable resin such as those mentioned above.

The several end walls and intermediate panels are then molded on suitable molds and the various apertures formed in several parts. The longitudinal beams are formed and secured to the shell as are the compressor housing and the rim 65 of the access opening. Panel 50 is secured to the slot in the bulkhead 18 and conduit 62 is secured to bulkhead 16. The two bulkheads are then properly positioned, sealed and secured in the relation indicated above. Only application of the sealing adhesive to the peripheral rim of the intermediate bulkheads and to the beam notch interface thereof need by accomplished from within the tank. All the other assembly, including the riveting, may be achieved by an operator outside of the tank. Preferably the air conduit 84 and manifold 86 will be in place prior to securing the intermediate bulkheads. The end walls are then secured with the intake and discharge conduits in place, and the compressor housing is attached. The compressor itself, of course, may be installed after the tank has been properly positioned and connected for use.

In use and operation of the described tank, it is preferably positioned entirely below the surface of the ground and completely covered with soil to a level slightly above the cover 70 of housing 66. However, if deemed necessary or desirable, one or both of the covers 64 and 70 may either protrude above the ground level or a suitable well may be formed in the covering soil to permit access to the covers 64 and 70. It is preferred to install the tank in a substantially horizontal position with the input end of intake conduit 52 positioned at or somewhat above the predetermined level 55 of sewage. This level of contained sewage is in effect, determined by the position of the discharge conduit 88 because the liquid communication between the several chambers will cause all liquid above the level of the bottom of the discharge conduit 88 to leave the tank through the conduit.

The entire tank assembly is readily transportable. When formed of the described lightweight but rigid construction of molded glass fiber impregnated resin, the total weight of a 1,200 gallon tank is approximately 400 pounds as compared with the 10,000 pounds of a cement tank.

Upon initial installation, the tank is first filled with sewage and the compressor is run to discharge air into the second compartment 58 continuously for 2 weeks. At this time the tank and its contents have reached a relatively stable operating condition, wherein the fluid discharged from conduit 88 has adequate clarity, pH and bacterial content such as will meet common state health codes. In the course of normal operation, the raw sewage enters through intake conduit 52 and is conducted below the surface 55 by the depending leg 54 of the intake conduit. Thus the hard and nearly impervious surface that will form at the upper several inches of the contents of the primary treatment chamber 56 will in no way interfere with entry of additional sewage to be treated. Thus the latter may mix readily with previous contents of this chamber. The entering sewage is retained in the first chamber for a length of time sufficient to allow a solid matter to settle to the sludge layer at the bottom of the tank. Here the anaerobic bacterial action acts upon the sewage solids to break these down both physically and biochemically so that sewage containing relatively smaller solids will pass through the transfer conduit 61, 62, 63, into the second major chamber, or aeration chamber 58.

The compressor, which may be operated only intermittently after the initial stabilization of the tank, causes jets of air to be distributed and forced outwardly and downwardly from manifold 86. These jets impinge upon the bottom and lower side of the chamber 58 and are directed upwardly by the somewhat eliptically curved sides to impinge upon the horizontal stiffening beams 26 and 28. This enhances the turbulence imparted to the contents of this chamber. The air jets entrain the liquid and solid particles suspended therein to achieve an improved circulation and mixing of the entire contents of the chamber 58. Exceedingly efficient oxygenation is also achieved. Accordingly, in the aeration chamber the anaerobically treated sewage from the primary treatment chamber 56 is mixed with activated sludge and fully aerated so that the aerobic bacterial decomposition process may progress rapidly and efficiently.

The third major chamber 60 of the described tank is divided into two compartments by the inclined panel 50. Both of these compartments perform a clarifying and settling action of which the efficiency is greatly enhanced by the described arrangement of dual compartments of this chamber.

Aerobically digested and aerated sewage flows from chamber 58 into the first or forward compartment of chamber 60, through the opening 48 in the intermediate bulkhead 18. As the sewage flows into chamber 60 it impinges upon the forward surface of panel 50 (that surface which faces the intermediate bulkhead 18) and is caused to move upwardly along the face of this panel. The relatively larger pieces of suspended flocculent will settle downwardly within the forward compartment of chamber 50 toward this forward facing surface of panel 50 and gradually descend along the panel. A body of this relatively fine deposited flocculent is built up at or about the slot 48. The larger pieces of settling flocculent will return through the slot 48 to the bottom of chamber 58 where they will be once again subject to aerobic digestion and decomposition. The accumulation of relatively fine flocculent deposited upon the forward surface of panel 50 adjacent the opening 48 will act as a filter to some extent whereby the contents of chamber 60 are further clarified.

As the sewage entering chamber 60 moves up the surface panel 50 and further away from the bulkhead 18, its velocity decreases. The rearward compartment of the settling and clarifying chamber 60 is in effect partly defined by the upper and rearward extremity of the panel 50. Accordingly, the area within chamber 60 forward of the panel 50 and between the sides 53 and 51 may be considered to comprise a first settling and clarifying compartment. The remainder of the chamber 60 to the rear and to the sides of panel 50 and its side walls 52 and 54 comprises a second stage compartment for achieving clarification and settling.

By the time the flowing clarified sewage passes to the rear of the rearmost edge of panel 50, the greatest portion of large solids has been precipitated whereby only the smallest particles remain. There is minimal circulation in the compartments of chamber 60, and this arrangement that provides two settling and clarifying chambers further decreases the circulation. Furthermore, the finest of the suspended particles will settle to the bottom of the tank between the end wall 14 and the rear surface of the inclined panel 50. Accordingly such fine particles are collected at a point where they are almost entirely isolated from the influence of any circulating liquid. To the extent that such fine particles can or may be deposited upon the forward facing surface of the inclined panel 50, they will be continuously subjected to the flow of sewage through the slot 48 and thereby tend to be once again entrained. Accordingly, the provision of the second clarifying and settling compartment to the rear of the inclined panel 50, enhances final removal of fine particles from the liquid to be discharged.

Liquid is discharged from the rearward settling and clarifying compartment of chamber 60, flowing up through the downwardly projecting leg 89 and thence to the discharge conduit 88. Upwardly projecting leg 90 of the discharge conduit enables access to the contents of the settling and clarifying chambers for sampling and testing of the effluent.

The described aeration septic tank provides an effluent that conforms with requirements of health authorities in many jurisdictions. The highly treated aeration effluent eliminates the need for excessive leeching fields. Frequent pumping of the tank as is normally required with conventional septic tanks, is eliminated. Under average conditions of use, the described tank need not be pumped. Solids are partially decomposed in the primary treatment chamber and further decomposed in the aeration chamber. Fine particles are precipitated from the effluent in the clarifying and settling chambers whereby the effluent is normally substantially colorless, odorless and of minimized polluting effect.

Figure 8:
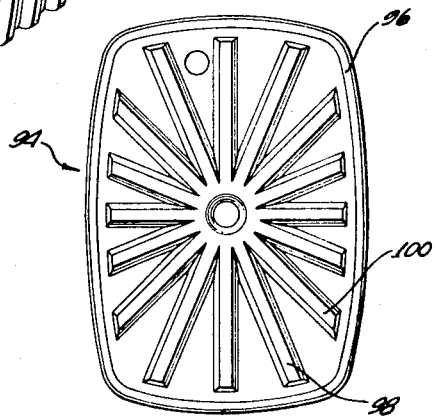
FIG. 8 illustrates another embodiment of the tank end walls.

An alternate arrangement of one or both the end walls 12 and 14 is illustrated in FIG. 8 which shows a molded end wall 94, also molded of a fiber glass impregnated resin and having a continuous peripheral strengthening rim 96. In this embodiment however, in order to provide omni-directional stiffening of the end wall, the corrugations such as 98, 100 are caused to extend in a number of diverse radial directions.

There has been described a four compartment aeration septic tank of an improved rigid and lightweight construction that is readily transportable, simple to manufacture and assemble, and highly efficient in treatment of sewage.

The foregoing detailed description is to be clearly understood as given by way of illustration and example only, the spirit and scope of this invention being limited solely by the appended claims.

We claim:

1. An aeration septic tank comprising
   an outer tubular shell extending longitudinally for substantially the full length of the tank, said shell being formed of a relatively thin plastic material molded with a plurality of longitudinally spaced circumferentially extending corrugations,
   first and second end walls, each respectively secured to and sealing opposite ends of said tubular shell, each said end wall being formed of a relatively thin sheet of plastic material and each being molded with a plurality of mutually spaced corrugations extending across the end wall, each said end wall being molded with a substantially continuous peripheral stiffening rim, said stiffening rim being formed with an exterior surface that mates with a peripheral end portion of an end corrugation of the corrugations of said tubular shell, and
   means for securing and sealing said end corrugations and said end wall rims to each other,
   a pair of intermediate bulkheads secured to and within said tubular shell at points mutually spaced from each other and from each of said end walls, said first and second intermediate bulkheads separating said tank into first, second and third chambers collectively adapted to receive and retain sewage to be treated and under treatment at a predetermined liquid level therein,
   a plurality of stiffening beams extending longitudinally of said tubular shell and secured thereto,
   an intake conduit having an inlet portion and a discharge portion mutually connected by an elbow, said inlet portion being sealed to said first end wall and extending therethrough, said discharge portion extending within said first chamber generally downwardly to a point considerably below said predetermined liquid level whereby sewage entering the tank is discharged into said first chamber well below the surface of sewage contained therein at said predetermined level,
   a conduit extending through said first intermediate bulkhead to provide liquid communication between said first and second chambers,
   said conduit having an intermediate portion substantially at said predetermined level and having a first end portion terminating within said first chamber at a point below said predetermined liquid level whereby sewage will flow from a point below the surface of sewage contained in said first chamber through said first intermediate bulkhead into said second chamber,
   means for aerating contents of said second chamber,
   said second intermediate bulkhead being formed with an opening therein that extends across said tank in a direction substantially parallel to the surface of sewage contained therein, opposite end portions of said opening being spaced inwardly of the outer edges of said second intermediate bulkhead,
   said opening being positioned adjacent the bottom of said second intermediate bulkhead but spaced upwardly therefrom whereby said second intermediate bulkhead has a continuous unbroken peripheral portion to enhance structural rigidity and attachment thereof to said tubular shell, and
   means for dividing said third chamber into two settling and clarifying compartments,
   said last mentioned means comprising a panel having a lower end portion secured to the lower edge of said opening of said second intermediate bulkhead and extending from said second intermediate bulkhead within said third chamber upwardly toward said second end wall,
   said panel having its upper end spaced inwardly of said second end wall to provide a space for material suspended in liquid within said third chamber to settle downwardly along said second end wall and between said panel and said second end wall, said panel having an inclined surface facing said second intermediate bulkhead whereby matter suspended in liquid of said third chamber above said panel will settle upon said inclined surface and tend to move along said inclined surface toward said opening of said second intermediate bulkhead, and a discharge conduit sealed to and extending through said second end wall substantially at said predetermined liquid level.

2. The apparatus of claim 1 wherein said means for aerating said second chamber comprises an air compressor mounted externally of said tank, an air conduit having one end connected to receive air under pressure from said compressor and extending through said tubular shell to a point adjacent the bottom of said second chamber, and an air distribution manifold connected to said air inlet conduit and having a plurality of air discharging apertures distributed along said tank adjacent the bottom thereof.

3. The apparatus of claim 2 wherein said air distribution conduit comprises a conduit extending within said second chamber longitudinally thereof and closely adjacent one side of the tank, said injection conduit being formed with a plurality of air injection apertures for injecting air outwardly and downwardly thereof toward the sides and bottom of the second chamber.

4. The apparatus of claim 3 wherein said stiffening beams include first and second side beams secured to mutually opposite interior side portions of said shell, said first and second intermediate bulkheads being formed with a lateral notch on each side thereof to receive said stiffening beams, said shell being formed with the lower portions thereof extending upwardly and outwardly, whereby air discharged from said downwardly and outwardly directed apertures or nozzles of said air distribution conduit together with sewage and liquid that is moved thereby will impinge upon the outwardly inclined sides of said tubular shell and thereupon flow upwardly along the shell to impinge upon the lower surface of at least one of said stiffening beams and thereby enhance the turbulence and mixing action of the aeration process.

5. The structure of claim 2 wherein said compressor is mounted in a housing secured to an upper external surface of said tubular shell, said housing comprising interconnected side and end walls, each housing end wall having the lower end thereof formed with an inwardly directed support flange extending across the housing and each support flange resting upon and supported by an upper surface of one of the corrugations of said tubular shell that extends across the top of said shell, each housing end wall further including a positioning and attachment flange formed integrally with and extending downwardly and inwardly from an inner end of respective ones of said support flanges, each said positioning and attachment flange mating with a corresponding inclined surface of a respective one of said first and second transverse upper corrugations, means for securing each said positioning sand attachment flanges to respective upper surfaces of said first and second transverse corrugations, thereby to firmly secure and retain said housing to and upon said tubular shell, a support having opposite end portions carried by said first and second support flanges within said housing and bridging said first and second transverse corrugations, said compressor being mounted upon said support within said housing.

6. The apparatus of claim 4 wherein at least one of said end bulkheads has the corrugations thereof extending in a plurality of mutually angulated directions along said bulkhead to provide substantially omnidirectional stiffening thereof.

7. The structure of claim 1 wherein each of said intermediate bulkheads is formed with a peripheral flange that mates with and is contiguous to an innermost surface of a corrugation of said tubular shell whereby said intermediate bulkhead may be fixed to said shell by fastening means extending through the mating corrugation and flange of said shell and bulkhead and applied from the exterior of said shell.

8. An aeration septic tank comprising
an outer shell formed of a relatively thin molded material,
first and second end walls, each respectively secured to and sealing opposite ends of said shell,
a pair of mutually spaced intermediate bulkheads secured to and within said shell at points mutually spaced from each other and from each of said end walls,
said first and second intermediate bulkheads separating said tank into first, second and third chambers collectively adapted to receive and retain sewage to be treated and sewage under treatment at a predetermined liquid level therein,
an intake conduit having an inlet portion and a discharge portion mutually connected by an elbow, said inlet portion being sealed to said first end wall and extending therethrough at a point above said predetermined liquid level, said discharge portion extending within said first chamber generally downwardly to a point considerably below said predetermined liquid level whereby sewage entering the tank is discharged into said first chamber below the surface of sewage contained therein at said predetermined level,
an intermediate conduit extending through said first intermediate bulkhead and providing liquid communication between said first and second chambers,
an air compressor,
an air distribution manifold within said second chamber and connected with said compressor,
said second intermediate bulkhead being formed with an opening therein that extends across said tank in a direction substantially parallel to the surface of sewage contained therein, opposite end of portion of said opening being spaced inwardly of the outer edges of said second intermediate bulkhead, said opening being positioned adjacent the bottom of said second intermediate bulkhead but spaced upwardly therefrom whereby said second intermediate bulkhead has a continuous unbroken peripheral portion to enhance structural rigidity and attachment thereof to said shell, and
means for dividing said third chamber into two mutually distinct settling and clarifying compartments, said last mentioned means comprising
a panel having a lower end portion secured to the lower edge of said opening of said second intermediate bulkhead, said panel extending nearly entirely across said bulkhead and upwardly and rearwardly within said third chamber toward said second end wall, said panel having its upper end spaced inwardly of said second end wall to provide a space in which particles suspended in liquid within said third chamber may settle downwardly along said second end wall and rearwardly of said panel, said panel having an inclined surface facing said second intermediate bulkhead whereby particles suspended in liquid within said third chamber above said panel will settle upon said inclined surface and tend to move downwardly along said inclined surface toward said opening of said second intermediate bulkhead, and a discharge conduit sealed to and extending through said second end wall substantially at said predetermined liquid level.

9. The aeration septic tank of claim 8 wherein said intermediate conduit is of substantially inverted U-shape, having an inlet portion extending below the level of sewage in said first chamber, and having a discharge portion extending below the level of sewage in said second chamber.

* * * * *